United States Patent [19]
Yamaguchi et al.
[11] Patent Number: 4,879,050
[45] Date of Patent: Nov. 7, 1989

[54] METHOD FOR FIRE EXTINGUISHMENT OF CHLOROSILANES

[75] Inventors: Hisayoshi Yamaguchi, Tokyo; Tamotsu Yanagisawa, Niigata; Masao Yabuzuka, Gunma; Masakatu Shimizu; Takashi Tanaka, both of Niigata, all of Japan

[73] Assignee: Co., Ltd. Shin-Etsu-Handota, Tokyo, Japan

[21] Appl. No.: 253,705

[22] Filed: Oct. 5, 1988

[30] Foreign Application Priority Data

Oct. 6, 1987 [JP] Japan ............ 62-252211

[51] Int. Cl.[4] ............ C09K 21/00
[52] U.S. Cl. ............ 252/2; 169/46; 169/47; 252/8; 252/7
[58] Field of Search ............ 252/2, 3, 7, 8, 601; 169/46, 47

[56] References Cited

U.S. PATENT DOCUMENTS

| | | | |
|---|---|---|---|
| 2,294,532 | 9/1942 | Fahey et al. | 252/2 |
| 2,368,209 | 1/1945 | Fahey et al. | 252/2 |
| 2,880,172 | 3/1959 | McCutchan | 252/2 |
| 3,055,435 | 9/1962 | Warnock et al. | 169/31 |
| 3,393,155 | 7/1968 | Schutte et al. | 252/2 |
| 3,830,738 | 8/1974 | Cottrell | 252/4 |
| 3,963,627 | 6/1976 | Cottrell | 252/4 |
| 4,173,538 | 11/1979 | Herbline | 252/8 |
| 4,226,727 | 10/1980 | Tarpley, Jr. et al. | 252/8 |
| 4,346,012 | 8/1982 | Umaba et al. | 252/7 |

FOREIGN PATENT DOCUMENTS

| | | | |
|---|---|---|---|
| 0122576 | 7/1985 | Japan | 252/2 |
| 2060572 | 3/1987 | Japan | 252/2 |

OTHER PUBLICATIONS

"Emergency Response Plan", Union Carbide, (3/1/80).
"6.2 Chlorosilanes", Dow Corning Publication, Properties and Essential Information for Handling and Use of Chlorosilanes, 40 pages.

*Primary Examiner*—Howard J. Locker
*Attorney, Agent, or Firm*—Jules E. Goldberg

[57] ABSTRACT

The invention provides an efficient and reliable method for extinguishing fire of a chlorosilane compound, which is a notoriously dangerous inflammable material in respect of the difficulty of extinguishment of fire thereof, by sprinkling a specific porous inert silica based or silica-alumina based powder defined by the content of silica or overall content of silica and alumina as well as various parameters as a powdery material followed by spraying an aqueous solution of sodium chloride, potassium chloride or calcium chloride. The fire extinguishing efficiency can be further enhanced when the sprinkled powder is a blend of the above defined porous powder and a specific silica sand in a specific proportion. When the sprinkled powder is such a binary blend, considerably good results can be obtained even by omitting the step of spraying of the aqueous salt solution.

5 Claims, No Drawings

METHOD FOR FIRE EXTINGUISHMENT OF CHLOROSILANES

BACKGROUND OF THE INVENTION

The present invention relates to a method for fire extinguishment of burning chlorosilane compounds.

Chlorosilane compounds in general are very unstable in moisture-containing air and highly inflammable with a low flash point. Once a chlorosilane compound is set on fire, toxic gases such as hydrogen chloride are produced and the fire can hardly be extinguished by any conventional method for first extinguishment. Conventional powdery fire-extinguishing agents are quite ineffective in extinguishing fire on a burning chlorosilane compound. Moreover, the constituents of such a powdery fire-extinguishing agent sometimes react with the chlorosilane compound to accelerate evolution of toxic gases such as chlorine and hydrogen chloride.

Gaseous and liquid fire-extinguishing agents such as carbon dioxide and highly halogenated organic compounds are also not so effective for extinguishment of fire on a burning chlorosilane compound.

Naturally occurring materials such as dry sand and water are effective fire extinguishing agents for fire of most of combustion materials but they are also not quite effective for the purpose of extinguishment of fire on a burning chlorosilane compound. For example, fire on a burning chlorosilane compound cannot be extinguished with dry sand unless the volume of the sand sprinkled over the fire is very large. Certain impurities contained in sand may react with the chlorosilane eventually to produce toxic gases. Water as a fire-extinguishing agent is also not satisfactory for the purpose of extinguishing the fire on a burning chlorosilane compound because, even by setting aside the relatively low power of fire extinguishment, water reacts with all kinds of chlorosilane compounds to cause problems of evolution of toxic gases such as hydrogen chloride and fume of silica particles and formation of a large amount of gelled materials. Certain chlorosilane compounds may react with water to produce hydrogen gas which is inflammable or explosive when it is mixed with oxygen in the atmospheric air.

To give a general discussion, fire extinguishment is conducted on the base of one or a combination of any two or more of four principles including (1) removal of the combustible material from the burning site of the fire, (2) suffocation of the fire by shielding the fire from the supply source of oxygen, (3) cooling by absorbing the heat of combustion so as to decrease the temperature of the burning material below the ignition temperature thereof and (4) suppression of the fire propagation by blocking the chain-like reaction of combustion. It is of course that at least two of these principles should be combined to exhibit a synergistically more powerful effect than relying on a single principle.

In this regard, none of the conventional methods of fire extinguishment is effective for extinguishment of fire on a burning chlorosilane compound, such as trichlorosilane and methyl dichlorosilane, which is notorious in respect of the difficulty of fire extinguishment once it is set on fire, in particular, at a high temperature of 25° C. or higher and a high relative humidity of 60% or more.

In U.S. Pat. No. 4,830,762, the present inventors disclosed a method for extinguishing fires on burning chlorosilane compounds utilizing an inert inorganic powder composed of silicon dioxide or a combination of silicon dioxide and aluminum oxide and thereafter, spraying water or highly halogenated liquid hydrocarbon compound over the inert powder. However, while this method is effective, it does suffer a disadvantage in that the water or highly halogenated hydrocarbon compound may be evaporated due to the heat of the burning chlorosilane compound. Thus, the beneficial effects of the water or highly halogenated hydrocarbon compound can be dissipated due to its evaporation.

SUMMARY OF THE INVENTION

The present invention accordingly has an object to provide an improved method for efficiently extinguishing fire on a burning chlorosilane compound, in which the fire can be rapidly and reliably extinguished based on the above mentioned four principles as combined to exhibit a synergistic effect in compliance with the type of the burning material and the environmental conditions under which the fire extinguishing work is conducted.

The method of the invention is practiced in three different aspects. The inventive method for extinguishing fire on a burning chlorosilane compound according to the first aspect comprises the successive steps of:

(a) sprinkling, over the burning site of the chlorosilane compound, an inert inorganic powder composed of porous particles having a particle diameter in the range from 5 μm to 5 mm, pore diameter in the range from 0.1 to 100 μm, true density in the range from 2.1 to 2.5 g/cm$^3$ and bulk density in the range from 2.0 to 0.7 g/cm$^3$ and containing at least 80% by weight of silicon dioxide $SiO_2$ or at least 90% by weight as a total amount of silicon dioxide $SiO_2$ and aluminum oxide $Al_2O_3$; and (b) spraying, over the layer of the inert inorganic powder covering the burning site of the chlorosilane compound, an aqueous solution of a salt selected from the group consisting of sodium chloride, potassium chloride and calcium chloride.

The method of the present invention according to the second aspect thereof is a modification of the method according to the first aspect thereof described above, in which the inert inorganic powder sprinkled over the burning site of the chlorosilane compound is a blend of:

(i) from 70 to 95% by weight of a silica based or silica-alumina based powder composed of porous particles having a particle diameter in the range from 5 μm to 5 mm, pore diameter in the range from 0.1 to 100 μm, true density in the range from 2.1 to 2.5 g/cm$^3$ and bulk density in the range from 0.2 to 0.7 g/cm$^3$ and containing at least 80% by weight of silicon dioxide $SiO_2$ or at least 90% by weight as the total amount of silicon dioxide $SiO_2$ and aluminum oxide $Al_2O_3$, and (ii) from 30 to 5% by weight of a silica sand shaped as polyhedral having a particle diameter in the range from 1 μm to 200 μm, true density in the range from 2.5 to 2.6 g/cm$^3$ and bulk density in the range from 1.0 to 1.2 g/cm$^3$ and containing at least 90% by weight of silicon dioxide $SiO_2$.

The method of the present invention according to the third aspect thereof comprises: sprinkling, over the burning site of the chlorosilane compound, an inert inorganic powder which is a blend of:

(i) from 70 to 95% by weight of a silica based or silica-alumina based powder composed of porous particles having a particle diameter in the range from 5 μm to 5 mm, pore diameter in the range from 0.1 to 100 μm, true density in the range from 2.1 to 2.5 $g/cm^3$ and bulk density in the range from 0.2 to 0.7 $g/cm^3$ and containing at least 80% by weight of silicon dioxide $SiO_2$ or at least 90% by weight as the total amount of silicon dioxide $SiO_2$ and aluminum oxide $Al_2O_3$, and (ii) from 30 to 5% by weight of a silica sand shaped as polyhedral having a particle diameter in the range from 1 μm to 200 μm, true density in the range from 2.5 to 2.6 $g/cm^3$ and bulk density in the range from 1.0 to 1.2 $g/cm^3$ and containing at least 90% by weight of silicon dioxide $SiO_2$.

DETAILED DESCRIPTION OF THE PREFERRED EMBODIMENTS

The hardly fire-extinguishable chlorosilane compounds implied in the present invention, which is directed to extinguishment of fire thereof, are important industrial chemicals consumed in large quantities as the starting materials in the manufacture of various kinds of silicones, high-purity semiconductor silicon and synthetic silica glass. Chlorosilane compounds are represented by the general formula $R_nSiH_mCl_{4-n-m}$, in which R is a monovalent hydrocarbon group which is mostly a methyl group or a phenyl group and the subscripts of n and m are each zero or a positive integer not exceeding 3 with the proviso that n+m is zero or a positive integer not exceeding 3. Examples of chlorosilane compounds include trichlorosilane $SiHCl_3$, trimethyl chlorosilane $Me_3SiCl$, methyl dichlorosilane $MeSiHCl_2$, dimethyl dichlorosilane $Me_2SiCl_2$, methyl trichlorosilane $MeSiCl_3$, phenyl trichlorosilane $PhSiCl_3$, diphenyl dichlorosilane $Ph_2SiCl_2$ and the like, in which Me and Ph denote a methyl group and a phenyl group, respectively.

Each of these chlorosilane compounds is an inflammable liquid and, when it is set on fire, it burns violently producing toxic gases such as hydrogen chloride and sometimes chlorine gas of still higher toxicity and the fire can hardly be extinguished by any conventional method for fire extinguishment. In particular, fire extinguishment of a chlorosilane compound is even more difficult when the chlorosilane compound has a hydrogen atom directly bonded to the silicon atom in the molecule as in trichlorosilane and methyl dichlorosilane. The present invention provides an efficient and reliable method for extinguishment of fire even when these chlorosilane compounds having a silicon-bonded hydrogen atom are burning at a relatively high temperature in a high-humidity ambience.

In each of the three aspects of the invention method, an inert inorganic powder composed of porous particles is sprinkled over the burning site of the chlorosilane compound. The inert inorganic powder is composed of silica based porous particles containing at least 80% by weight of silicon dioxide $SiO_2$ or silica-alumina based porous particles containing at least 90% by weight as a total of silicon dioxide $SiO_2$ and aluminum oxide $Al_2O_3$. Content of impurities therein should desirably be as small as possible. These porous particles have a high purity as prepared by an acid treatment of a naturally occurring material followed by drying and calcination.

The impurities possibly contained in the inorganic powder include iron oxide $Fe_2O_3$, calcium oxide CaO, magesium oxide MgO, potassium oxide $K_2O$, sodium silicate $xNa_2O.ySiO_2$ and the like as well as water. The alkali or alkaline earth based impurities such as potassium oxide, calcium oxide, magnesium oxide and the like may directly react with the chlorosilane compound to produce toxic gases such as hydrogen chloride and inflammable gases such as hydrogen. Water contained in the inorganic powder serves as a hydrolyzing agent of the chlorosilane compound also to produce toxic gases such as hydrogen chloride and inflammable gases such as hydrogen. This is the reason for the requirement that the impurity content in the porous inorganic powder should be as small as possible.

A most preferable silica-based inorganic powder containing at least 80% by weight of silicon dioxide and usable in the inventive method can be prepared from a natural product available under a tradename of Silton 3S occurring in the Itoigawa district of Japan which is subjected to calcination and then to a refining treatment. Typically, the material has a true density of 2.4 $g/cm^3$ and a bulk density of 0.35 $g/cm^3$ and contains 89.1% by weight of silicon dioxide. A typical silica-alumina based porous inorganic powder can be prepared by blending and mulling the above mentioned Silton 3S and kaolin with addition of a small volume of water followed by drying, calcination, pulverization and particle size classification. Such a powder typically has a true density of 2.5 $g/cm^3$ and a bulk density of 0.45 $g/cm^3$ and contains 68% by weight of silicon dioxide and 23% by weight of aluminum oxide.

These porous inorganic powders should have a particle size distribution within a range from 5 μm to 5 mm. Finer particle than above are undesirable as a powdery fire extinguishing agent of chlorosilanes because they are readily blown away by the violence of the flames of the burning chlorosilane compound. This is a quite unique feature of the porous powder used in the inventive method as compared with conventional powdery fire extinguishing agents which, as a standard, should have a particle size distribution not exceeding 177 μm and mostly centering around 10 μm.

The pore diameter in these porous inorganic particles is essentially in the range from 0.1 to 100 μm. When the pore diameter in the particles is too small, as in a silica gel or silica-alumina gel, the powder may have an unduly high activity or capacity of adsorption so that, when the powder is brought into contact with a chlorosilane compound, a large quantity of heat of adsorption is produced and the temperature of the chlorosilane is increased so much to accelerate vaporization of the chlorosilane compound resulting in further enhancement of the violence of the fire very dangerously.

It is optional that the porous silica or silica-alumina based powder is subjected to a surface treatment with an organopolysiloxane fluid such as a methyl hydrogen polysiloxane to be imparted with improved hydrophobicity or moisture-proofness and increased flowability of the powder. Such an improved powder can be used as a fire extinguishing agent which is a filling of conventional powder-ejecting fire extinguishers.

In the second step of the inventive method according to the first aspect, an aqueous solution of an inorganic salt is sprayed over the layer of the porous powder sprinkled to cover the burning chlorosilane compound. The inorganic salt is selected from the group consisting of sodium chloride, potassium chloride and calcium chloride and the concentration of the salt in the aqueous solution is preferably in the ranges from 15 to 30% by weight, from 15 to 25% by weight and from 15 to 30% by weight, respectively.

In the inventive method according to the second aspect thereof, the porous inorganic powder sprinkled over the burning chlorosilane compound is a blend of the above described silica or silicaalumina based powder as a first inorganic powder and a second inorganic powder which is a silica sand shaped as polyhedral having a particle diameter in the range from 1 to 200 μm, true density in the range from 2.5 to 2.6 g/cm$^3$ and bulk density in the range from 1.0 to 1.2 g/cm$^3$ and containing at least 90% by weight of silicon dioxide. Such a silica sand can be obtained by subjecting a naturally occurring silica sand to crushing followed by treatments of washing with water, drying and particle-size classification so that the particle size is within the above mentioned desirable range.

Silica sand is an important material used industrially as a starting material of glass and as a material for molds of metal casting. Available products of silica sand include so-called natural silica sand and artificial silica sand. Natural silica sand can be prepared from naturally occurring silica-rich sand found in mountain districts, river sides or sea coasts taken by open-cut mining and subjected to a refining treatment of rinsing with water to remove a trace amount of clay and salt contained therein followed by drying and particle-size classification by screening. Particles of natural silica sand generally have a rounded configuration as a result of the strong weathering and attrition by the transportation activity of water and wind so that naturally occurring silica sand as such is not suitable for use in the inventive method. The particles of a so-called "Gairome" silica sand, which is a kind of natural silica sand, can be imparted with a polyhedral configuration suitable for use in the invention method when the sand is crushed in a conical mill.

Artificial silica sand here implied includes those obtained by crushing a quartzite rock, which is an aggregate of quartz grains, and the like in addition to the above mentioned sand obtained by crushing the "Gairome" silica sand. As a result of the crushing works, the particles of these silica sand materials have a polyhedral configuration suitable for use in the inventive method. Naturally occurring silica materials containing 90% by weight or larger amount of silicon dioxide can be obtained in any large quantities without limitation.

In the inventive method according to the second aspect thereof, the inorganic powder sprinkled over the fire is a mixture of 70 to 95% by qeight of the porous silica based or silica-alumina based powder as used in the inventive method according to the first aspect and 30 to 5% by weight of the above described silica sand having a polyhedral configuration. Similarly to the method according to the first aspect, sprinkling of the inorganic powder over the burning chlorosilane compound is followed by spraying of an aqueous solution of a specified salt.

In the inventive method according to the third aspect, spraying of an aqueous salt solution is omitted. Fire of a burning chlorosilane compound can be extinguished in some cases even by omitting spraying of the aqueous salt solution when the amount of the sprinkled powder is increased so much. Omission of spraying of the aqueous salt solution is advantageous in respect of the less contamination caused by the fire extinguishing works.

When the above described porous inorganic powder is sprinkled over the burning chlorosilane compound, no chemical change takes place in the inorganic powder since the inorganic powder has absolutely no reactivity with the chlorosilane and is incombustible and thermally stable. The liquid chlorosilane is first absorbed in the pores of the porous particles so as to exhibit a removing effect of the combustible material from the site of burning. When the sprinkled volume of the inorganic powder is sufficiently large to cover the surface of the chlorosilane under burning, the suffocating effect is also exhibited.

When the burning liquid is a chlorosilane compound containing a silicon-bonded hydrogen atom and boiling at a relatively low temperature such as trichlorosilane and methyl dichlorosilane, and the ambience is under conditions of high temperature and high humidity, difficulties are sometimes encountered in fire extinguishment by sprinkling the porous inorganic powder alone. Namely, a low noise by boiling is caused within the layer of the powder and the fire cannot be extinguished completely even by increasing the amount of the sprinkled powder. This is presumably because the chlorosilane having a relatively low boiling point is vigorously vaporized at the high temperature of burning and the vapor reacts with the moisture contained in the humid air in the relatively large interstices of the porous particles to be hydrolyzed producing inflammable hydrogen gas which is eventually ignited to burn producing a noise.

In the inventive method according to the first aspect, sprinkling of the porous inorganic powder is followed by spraying of an aqueous solution of a salt which is sodium chloride, potassium chloride or calcium chloride. When a sufficiently large volume of the salt solution of a sufficiently high concentration is sprayed over the layer of the porous inorganic powder so as to cover the burning chlorosilane compound, the water in the solution moistening the powder is rapidly vaporized to leave the salt as contained in the inorganic powder which forms a crust layer to serve as a shielding of the atmospheric air so that extinguishment of the fire is accelerated. The crust layer also serves to prevent emission of inflammable gases. Thus, the fire of the burning chlorosilane compound can be rapidly and reliably extinguished as a result of the synergistic effect. Needless to say, the above mentioned salts are each neutral and very stable to cause absolutely no chemical reaction when they are contacted with chlorosilane compounds.

An aqueous solution of a salt becomes frozen at a temperature lower than 0° C. as a consequence of the freezing point lowering so that the aqueous salt solution can be stored and ready to use even in a very cold climatic condition of winter when water cannot be used for fire extinguishment because it is frozen.

In the prior art, potassium carbonate is usually used as a reinforcing agent of fire extinguishing agents in the form of a concentrated aqueous solution thereof. In addition, ammonium phosphate, lithium acetate and some other acetates are known to be still more effective for the same purposes. In the case of fire extinguishment of chlorosilanes, however, potassium carbonate and ammonium phosphate among the above named salts, which indicate alkalinity in an aqueous solution, are not suitable for the purpose of fire extinguishment of chlorosilanes because they may both violently react with the chlorosilane compound in the presence of water in an aqueous solution.

The inventive method according to the first aspect thereof is still not quite effective when the burning chlorosilane compound is trichlorosilane or methyl dichlorosilane belonging to the class of the highest difficulty in respect of fire extinguishment and when the ambient conditions are very unfavorable including a high temperature of about 25° C. or higher and a high relative humidity of about 60% or higher. The inventive method according to the second aspect thereof can be applied to such a fire to exhibit a higher efficiency than the method according to the first aspect. The reason for the effectiveness thereof is presumably that the fine particles of the silica sand having a polyhedral configuration can enter the relatively large interstices between the particles of the porous inorganic powder to exhibit an effect of decreasing the volume of the air contained there so that the hydrolysis of the chlo-rosilane compound by the atmospheric moisture in the interstices is reduced so much to exhibit a further enhanced effectiveness of fire extinguishment.

It is important that the particles of the silica sand have a polyhedral configuration. When the particles have a round configuration or almost round one so that the silica sand may have a bulk density of 1.2 to 1.4 g/$cm^3$, the silica sand particles would fall through the interstices between the porous inorganic particles when the blend is sprinkled over the fire of the burning chlorosilane compound so that the above mentioned contribution of the silica sand to the fire extinguishing effect would be decreased.

In the following, the method of the present invention is described in more detail by way of examples.

EXAMPLE 1.

A 50 ml portion of trichlorosilane was taken in a stainless steel-made vessel having an inner diameter of 10 cm and a depth of 6 cm and set on fire followed by uncontrolled burning for 20 seconds. Thereafter, the fire was extinguished by sprinkling a porous silica based powder and a silica sand having a polyhedral configuration each specified below either singly or as a blend in a weight proportion also indicated below.

The porous silica based powder, which was prepared by calcining and refining Silton 3S and referred to as the powder A hereinbelow, contained 89% by weight of silicon dioxide and had a particle diameter ranging from 10 to 500 μm, pore diameter ranging from 0.2 to 10 μm, true density of 2.3 g/$cm^3$ and bulk density of 0.35 g/$cm^3$. The silica sand having a polyhedral configuration prepared by washing with water, drying and screening for particle size classification, which is referred to as the powder B hereinbelow, contained 95% by weight of silicon dioxide and had a particle diameter ranging from 1 to 200 μm, true density of 2.55 g/$cm^3$ and bulk density of 1.10 g/$cm^3$.

The tests of fire extinguishment described below were conducted in an ambient conditions of a temperature of 30° C. and a relative humidity of 75%. The temperature of the trichlorosilane before ignition was 28° C. and increased gradually up to 30°to 40° C. as the combustion of the chlorosilane was continued.

Test 1:250 g of the powder A alone sprinkled; loud noise by boiling; fire not extinguishable; inapplicably poor overall efficiency Test 2:130 g of a 95:5 by weight blend of powders A and B sprinkled; low noise by boiling; fire extinguished within 30 seconds; good overall efficiency Test 3:120 g of a 80:20 by weight blend of powders A and B sprinkled; absolutely no noise by boiling; fire rapidly extinguished within 20 seconds; excellent overall efficiency Test 4:200 g of a 70:30 by weight blend of powders A and B sprinkled; considerably large noise by boiling; fire rapidly extinguished within 50 seconds; good overall efficiency Test 5:200 g of a 50:50 by weight blend of powders A and B sprinkled; large noise by boiling; fire difficulty extinguished within 100 seconds; poor overall efficiency Test 6:500 g of the powder B alone sprinkled; loud noise by boiling; fire not extinguishable; inapplicably poor overall efficiency As is summarized above, the fire of burning trichlorosilane was not extinguishable by sprinkling the powder A alone but the efficiency of fire extinguishment could be greatly improved when the sprinkled powder contained 5% by weight of the powder B and the fire extinguishing efficiency was excellent when the sprinkled powder is a 80:20 blend of the powders A and B. The fire extinguishing efficiency of the sprinkled powder was again decreased when the weight proportion of the powder B is further increased. Thus, the blending proportion of the powders A and B should be in the range from 95:5 to 70:30 by weight.

EXAMPLE 2.

The procedure of the fire extinguishment tests carried out under ambient conditions of a temperature of 30° C. and relative humidity of 70% was substantially the same as in Example 1 except that the porous silica based powder was replaced with a silica-alumina based porous powder which was prepared by mulling a blend of Silton 3S and kaolin with addition of a small volume of water followed by calcination at 1000° C., leaching with hydrochloric acid, washing with water, dehydration and drying at 100° C. and referred to as the powder C hereinbelow. The powder C contained 68% by weight of silicon dioxide and 25% by weight of aluminum oxide and had a particle diameter ranging from 40 to 500 μm, pore diameter ranging from 0.1 to 50 μm, true density of 2.5 g/$cm^3$ and bulk density of 0.45 g/$cm^3$.

Test 7:300 g of the powder C alone sprinkled; loud noise by boiling; fire not extinguishable; inapplicably poor overall efficiency Test 8:200 g of a 95:5 by weight blend of powders C and B sprinkled; low noise of boiling; free extinguished within 40 seconds; good overall efficiency Test 9:150 g of a 80:20 by weight blend of powders C and B sprinkled; absolutely no noise by boiling; fire rapidly extinguished within 25 seconds; excellent overall efficiency Test 10:180 g of a 70:30 by weight blend of powders C and B sprinkled; low noise by boiling; fire extinguished within 35 seconds; good overall efficiency Test 11:250 g of a 50:50 by weight blend of powders A and B sprinkled; large noise by boiling; fire difficultly extinguished within 100 seconds; poor overall efficiency Test 12:500 g of the powder B alone sprinkled; loud noise by boiling; fire not extinguishable; inapplicably poor overall efficiency As is understood from the results summarized above, replacement of the powder A with the powder C even had an effect of increasing the fire extinguishing efficiency of the powder although the amount required for complete fire extinguishment is somewhat larger than in the use of the blend of the powders A and B. As to the blending proportion of the powders C and B, it seems to be preferable that the amount of the powder B is somewhat increased as compared with the blend of the powders A and B.

EXAMPLE 3.

A 50 ml portion of trichlorosilane was burnt in the same manner as in the preceding examples and sprinkling of 50 g of the powder A over the fire, by which smoke evolution could be remarkably decreased, was followed by spraying of an aqueous salt solution or, for comparison, water. The tests were conducted under ambient conditions of a temperature of 30° C. and relative humidity of 71%. The temperature of the trichlorosilane before ignition was 27° C. increasing gradually up to 30° to 40° C. as the combustion was continued.

Test 13: powder sprinkling followed by spraying of 15 ml of a 8% aqueous solution of sodium chloride; fire readily extinguished within 22 seconds Test 14: powder sprinkling followed by spraying of 10 ml of a 8% aqueous solution of potassium chloride; fire readily extinguished within 15 seconds Test 15: powder sprinkling followed by spraying of 15 ml of a 8% aqueous solution of calcium chloride; fire readily extinguished within 20 seconds Test 16: powder sprinkling followed by spraying of water; fire not extinguished After extinguishment of fire in Tests 13, 14 and 15, a volume of gas was evolved and the volume thereof was the smallest in Test 14 and the largest in Test 15.

As is understood from the above summarized results of the tests, spraying of an aqueous salt solution was quite effective as compared with mere water. When the amount of sprinkled powder A was increased from 50 g to 70 g and powder sprinkling was followed by spraying of water, the fire of trichlorosilane could be extinguished although the volume of the gas evolved after extinguishment of the fire, which was composed of water vapor and hydrogen chloride, was larger than in Test 15 according to the invention.

The above described results of the experiments well support the conclusion that the method of the invention is advantageous over conventional methods in the following respects:

(1) the fire of any chlorosilane compound, which is notorious in the difficulty of fire extinguishment when it has once been set on fire, can be rapidly and reliably extinguished by the inventive method;

(2) evolution of toxic gases can be greatly reduced or completely suppressed in the course of the fire extinguishing works according to the inventive method;

(3) no secondary hazard takes place not only in the course of the fire extinguishing works according to the inventive method but also after extinguishment of the fire;

(4) the volume of gas evolution after extinguishment of the fire can be minimized;

(5) the fire extinguishing agents used in the inventive methods are each inexpensive and sufficient effect can be obtained by using only a small amount thereof; and (6) the fire extinguishing agents after extinguishment of fire can be easily disposed because the agents are an inert inorganic powder and a neutral aqueous solution of a salt and this advantage is more remarkable when the inventive method is performed according to the third aspect of the invention in which the fire extinguish-ing agent is the inert inorganic powder alone.

What is claimed is:

1. A method for extinguishing fire of a chlorosilane compound which comprises the successive steps of:

(a) sprinkling, over the burning site of the chlorosilane compound, an inert inorganic powder composed of porous particles having a particle diameter in the range from 5 μm to 5 mm, pore diameter in the range from 0.1 to 100 μm, true density in the range from 2.1 to 2.5 g/cm$^3$ and bulk density in the range from 0.2 to 0.7 g/cm$^3$ and containing at least 80% by weight of silicon dioxide $SiO_2$ or at least 90% by weight as a total amount of silicon dioxide as $SiO_2$ and aluminum oxide as $Al_2O_3$; and (b) spraying, over the layer of the inert inorganic powder covering the burning site of the chlorosilane compound, an aqueous solution of a salt selected from the group consisting of sodium chloride, potassium chloride and calcium chloride.

2. A method for extinguishing fire of a chlorosilane compound which comprises the successive steps of:

(a) sprinkling, over the burning site of the chlorosilane compound, an inert inorganic powder which is a blend of (i) from 70 to 95% by weight of a silica based or silica-alumina based powder composed of porous particles having a particle diameter in the range from 5 μm to 5 mm, pore diameter in the range from 0.1 to 100 μm, true density in the range from 2.1 to 2.5 g/cm$^3$ bulk density in the range from 0.2 to 0.7 g/cm$^3$ and containing at least 80% by weight of silicon dioxide as $SiO_2$ or at least 90% by weight as the total amount of silicon dioxide as $SiO_2$ and aluminum oxide as $Al_2O_3$, and (ii) from 30 to 5% by weight of a silica sand of polyhedral configuration having a particle diameter in the range from 1 μm to 200 μm, true density in the range from 2.5 to 2.6 g/cm$^3$ and bulk density in the range from 1.0 to 1.2 g/cm$^3$ and containing at least 90% by weight of silicon dioxide as $SiO_2$; and (b) spraying, over the layer of the inert inorganic powder covering the burning site of the chlorosilane compound, an aqueous solution of a salt selected from the group consisting of sodium chloride, potassium chloride and calcium chloride.

3. A method for extinguishing fire of a chlorosilane compound which comprises the step of:

(a) sprinkling, over the burning site of the chlorosilane compound, an inert inorganic powder which is a blend of (i) from 70 to 95% by weight of a silica based or silica-alumina based powder composed of porous particles having a particle diameter in the range from 5 μm to 5 mm, pore diameter in the range from 0.1 to 100 μm, true density in the range from 2.1 to 2.5 g/cm$^3$ and bulk density in the range from 0.2 to 0.7 g/cm$^3$ and containing at least 80% by weight of silicon dioxide as $SiO_2$ or at least 90% by weight as the total amount of silicon dioxide as $SiO_2$ and aluminum oxide as $Al_2O_3$, and (ii) from 30 to 5% by weight of a silica sand of polyhedral configuration having a particle diameter in the range from 1 μm to 200 μm, true density in the range from 2.5 to 2.6 g/cm$^3$ and bulk density in the range from 1.0 to 1.2 g/cm$^3$ and containing at least 90% by weight of silicon dioxide as $SiO_2$.

4. The method for extinguishing fire of a chlorosilane compound as claimed in claim 1 wherein the aqueous solution of a salt used in step (b) contains from 15 to 30% by weight of sodium chloride, from 15 to 25% by weight of potassium chloride or from 15 to 30% by weight of calcium chloride.

5. The method for extinguishing fire of a chlorosilane compound as claimed in claim 2 wherein the aqueous solution of a salt used in step (b) contains from 15 to 30% by weight of sodium chloride, from 15 to 25% by weight of potassium chloride or from 15 to 30% by weight of calcium chloride.

* * * * *

UNITED STATES PATENT AND TRADEMARK OFFICE

CERTIFICATE OF CORRECTION

PATENT NO. : 4,879,050

DATED : November 7, 1989

INVENTOR(S) : Hisayoshi YAMAGUCHI, Tamotsu YANAGISAWA, Masao YABUZUKA, Masakatu SHIMIZU and Takashi TANAKA It is certified that error appears in the above—identified patent and that said Letters Patent is hereby corrected as shown below:

Title page, [73] Assignee:, change

"Co., Ltd. Shin-Etsu-Handota, Tokyo, Japan"

to

--Shin-Etsu Handotai Co., Ltd., Tokyo, Japan--

Signed and Sealed this

Nineteenth Day of May, 1992

*Attest:*

DOUGLAS B. COMER

*Attesting Officer*

*Acting Commissioner of Patents and Trademarks*